United States Patent [19]

Olfert

[11] Patent Number: 4,516,492
[45] Date of Patent: May 14, 1985

[54] BALE DISCHARGE PRESSURE PLATE

[76] Inventor: Abram J. Olfert, Box 7, Hague Saskatchewan, Canada, S0K 1X0

[21] Appl. No.: 539,948

[22] Filed: Oct. 7, 1983

[30] Foreign Application Priority Data

Oct. 7, 1982 [CA] Canada .................................. 413033

[51] Int. Cl.³ .............................................. B30B 9/30
[52] U.S. Cl. .................................................... 100/192
[58] Field of Search ............... 100/191, 192, 147, 148, 100/909, 43

[56] References Cited

U.S. PATENT DOCUMENTS 2,411,467 11/1946 Russell ................................ 100/192
3,350,999 11/1967 Morse ............................ 100/192 X

FOREIGN PATENT DOCUMENTS 465302 2/1968 Switzerland ........................ 100/191

Primary Examiner—Peter Feldman
Attorney, Agent, or Firm—Stanely G. Ade

[57] ABSTRACT

A bale discharge chute normally is provided with a pair of spaced and parallel sides, a lower member and a movable upper pressure plate having links connecting the distal ends. The present invention includes a transverse anchor member for the upper connection of the links together with an adjustable compression spring reacting between the member and the pressure plate thus giving superior pressure plate control and preventing damage from occurring to the structure due to excessive tension yet at the time will permit upward movement of the pressure plate if a predetermined pressure is exceeded.

6 Claims, 5 Drawing Figures

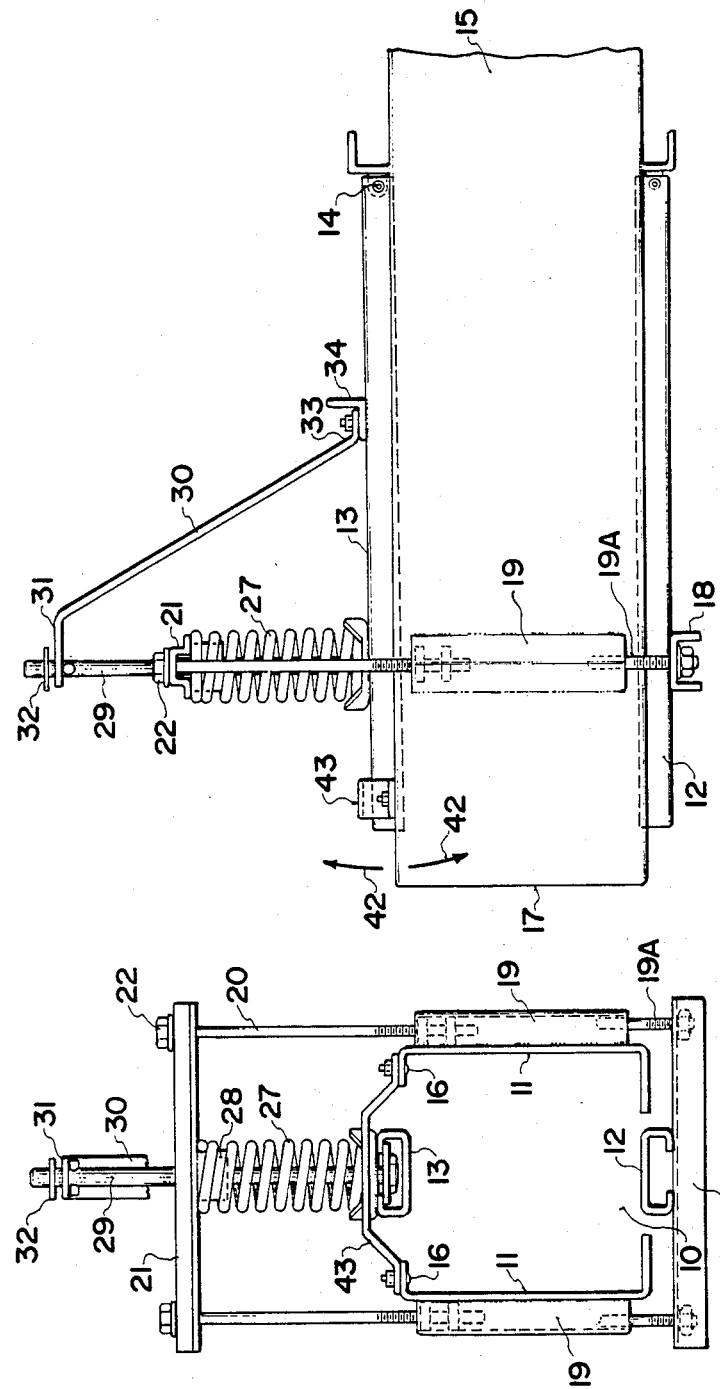

BALE DISCHARGE PRESSURE PLATE

BACKGROUND OF THE INVENTION

This invention relates to new and useful improvements in bale discharge chutes and pressure plates therefor.

Conventionally, the upper pressure plate is urged downwardly by means of tension springs which are adjustable but unfortunately, constant extension of these springs due to relatively large bales passing therethrough, tends to stretch the springs permanently thus leading to relatively expensive replacement.

A hydraulic ram system has been used to assist in the maintaining of the pressure plate and preventing untoward upward movement, but unfortunately such rams are preset and do not retract if excessive pressure is applied thus leading to damage to the discharge end of the chute. Once again, repair is relatively expensive and time consuming.

SUMMARY OF THE INVENTION

The present invention overcomes these disadvantages by preloading the upper beam yet at the same time allowing same to move upwardly if a predetermined pressure is exceeded.

In accordance with the invention there is provided in a bale discharge chute which includes a pair of spaced and parallel vertical side walls, a lower member and an upper pressure beam pivoted by one end thereof adjacent the inlet end of the chute and extending towards discharge end thereof between the upper edges of the vertical side walls and a pair of links between the chute and the beam; the improvement comprising an adjustable compression spring for pre-loading said beam and means mounting said compression spring from said chute whereby said compression spring reacts between said beam and said chute and normally urges said beam downwardly in a vertical arc around the pivot connection thereof to said chute.

Another aspect of the invention consists of a bale chute comprising in combination a pair of spaced and parallel vertical side walls, a lower wall and an upper pressure beam pivoted by one end thereof adjacent the inlet end of the chute and extending towards the discharge end thereof between the upper edges of the vertical side walls and a pair of links between the chute and the beam for loading the beam, means mounting said compression spring including means operatively connecting the upper ends of the links.

A further advantage of the invention is to provide a device of the character herewithin described which is easily and readily attached to existing tension spring type bale chutes.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a front elevation of a bale chute from the discharge end thereof showing the device in situ.

FIG. 2 is a side elevation of FIG. 1.

In the drawings like characters of reference indicate corresponding parts in the different figures.

DETAILED DESCRIPTION

Figure 3:
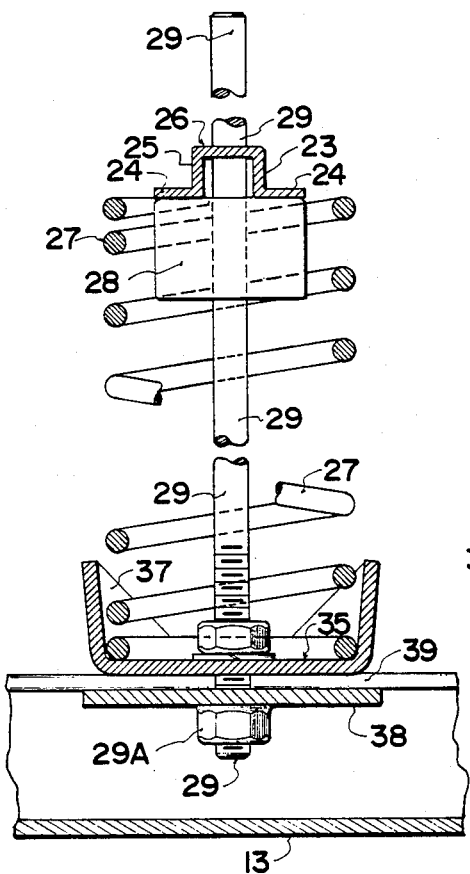
FIG. 3 is a fragmentary cross sectional view of the mounting of the compression spring assembly.
Figure 4:
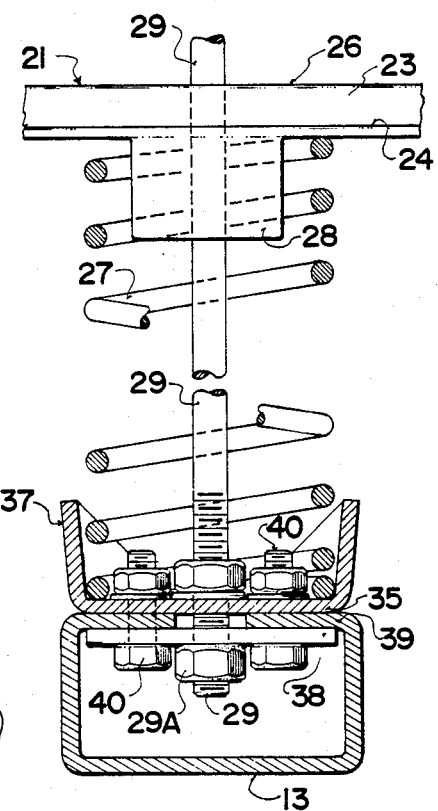
FIG. 4 is a view similar to FIG. 3, but taken at right angles thereto.

Proceeding therefore to describe the invention in detail, reference should first be made to FIGS. 1 and 2 in which the discharge chute generally designated 10 includes a pair of spaced and parallel side plates 11, a base member 12 and an upper pressure plate or beam 13, all of which is conventional. The beam 13 is pivoted adjacent the rear end 14 thereof, to the chute adjacent the intake end 15 and it extends forwardly between the upper edges 16 of the side plates, to adjacent the front or discharge end 17 of the chute.

A transverse channel member 18 spans the underside of the side plates 11 rearwardly of the discharge end 17 and this transverse member 18 acts as an anchor for a pair of heavy duty rigid links 19 which are secured by the lower ends thereof, one to each end of the transverse member 18 outboard of the side plates 11 of the chute.

Anchor bolts 20 are secured to and extend upwardly from the upper ends of the links 19 and these extend through an overspanning member 21 to which they are adjustably secured by means of nuts 22 engaging the screw threaded ends of the bolts 20, one upon each end of the overspanning member 21. This overspanning member includes a channel portion 23 with out-turned base flanges 24 with the bolts extending between the vertical side flanges 25 and engaging through the central horizontal portion 26 as clearly shown in FIG. 3.

This overspanning member forms a means to connect the links together at a location spaced above the beam 13.

A heavy duty compression spring 27 reacts between the centre of the overspanning member 21 and the beam 13 and applies downward pressure upon beam 13. A square boxing 28 is secured centrally of the overspanning member 21 and depends downwardly therefrom with the upper end of spring 27 surrounding the boxing which acts as a location means for the upper end of the spring 27. A compression spring guiding bolt 29 extends upwardly through the compression spring 27, freely through the boxing 28 and freely through the horizontal portion 26 of the overspanning member and a brace 30 is secured by the upper end 31 thereof over the upper end of the anchor or guiding bolt 29 and is secured thereto by means of nuts 32.

This brace extends rearwardly and downwardly to be secured by the lower end 33 thereof centrally of a transverse member 34 in the form of an angle iron, the purpose of which will hereinafter be described.

Figure 5:
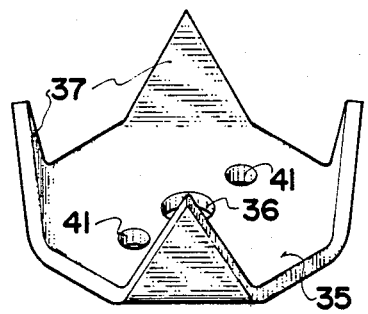
FIG. 5 is an isometric view of the lower mounting plate.

A rectangular plate 35 (shown in FIG. 5) is centrally apertured as at 36 and is provided with upturned corners 37 and this plate engages under the lower end of spring 27 and acts as a retainer. A further rectangular plate 38 is engaged under the in-turned flanges 39 of the channel member constituting the pressure beam 13 and is bolted to these flanges by means of nut and bolt assemblies 40 and these nut and bolt assemblies also engage through apertures 41 in the plate 35 and are secured thereto by means of nut 29A thus securing plate 35 to the beam 13.

The aforementioned angle iron member 34 is secured transversely to the beam 13 with the ends overlapping the upper edges 16 of the side plates 11 thus limiting the downward movement of the beam which normally moves in the direction of double-headed arrow 42 (see FIG. 2.)

A further overspanning member 43 is secured to the flanges 16 and is angulated upwardly therefrom as clearly shown in FIG. 1 and this limits the upward movement of beam 13.

In operation, the device is assembled to the beam 13 by means of nuts 22 screw threadably engaging the anchor bolts 20. The compression spring is adjusted by these nut and rod assemblies so that it will restrict the upper movement of the beam 13 until a predetermined load is reached, at which time it will compress and allow the beam to move upwardly towards the member 43 so that damage will not occur to the discharge end of the chute.

The variation in density of the straw making up the bales, together with the moisture content thereof, gives certain variations of density and pressures and the compression spring assembly hereinbefore described prevents over-stressing from occurring. Links 19 are preferably angle iron members with a bolt 19A welded to the internal angle at the lower end and engaging through an aperture in the cross member 18 and secured by a nut. A pair of spaced apart nuts are welded to the upper end of the link also in the internal angle and the screw threaded lower end of rod 20 engages these nuts.

It should be noted that the single, centrally located spring 27 permits the bar 21 to float evenly depending upon the load and any unevenness of straw in the bale thus providing relatively constant pressure of the preset spring across the bale.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a bale discharge chute which includes a pair of spaced and parallel vertical side walls, a lower member and an upper pressure beam pivoted by one end thereof adjacent the inlet end of the chute and extending towards the discharge end thereof between the upper edges of the vertical side walls and a pair of links extended between the chute and the beam for loading the beam said lines having upper ends; the improvement comprising an adjustable compression spring for pre-loading said beam and means mounting said compression spring from said chute whereby said compression spring reacts between said beam and said chute and normally urges said beam downwardly in a vertical arc around the pivotal connection thereof to said chute, said means mounting said compression spring upon said chute includes means operatively connecting the upper ends of the links together across the upper side of said chute and spaced upwardly from said beam, said compression spring reacting between said beam and said means connecting the upper ends of said links in order to pre-load said beam, and a compression spring locating member secured to said overspanning member and engaging within the upper end of said compression spring, a compression spring guiding bolt extending axially through said compression spring and freely through said locating member, an anchor plate at the base of said compression spring, the lower end of said bolt being secured to said anchor plate and securing plate means clamping said anchor plate to said pressure beam, a brace extending rearwardly between the upper end of said guide bolt and said pressure beam, means spanning said bale chamber forwardly of said overspanning member to limit the upward movement of said pressure beam and further means extending transversely of said pressure beam rearwardly of said overspanning member and engageable with the other side of said discharge chute to limit the downward movement of said beam.

2. The improvement according to claim 1 in which said means to connect the upper ends of said links includes an anchor rod extending upwardly from the upper end of each of said links and an overspanning member extending between adjacent the upper ends of said anchor rods, the upper end of said compression spring being engageable with said overspanning member substantially centrally thereof.

3. The improvement according to claim 1 which includes means to adjust the effective pressure of said compression spring upon said pressure beam.

4. A bale discharge chute comprising in combination a pair of spaced and parallel vertical side walls, a lower wall and an upper pressure beam pivoted by one end thereof adjacent the inlet end of the chute and extending towards the discharge end thereof between the upper edges of the vertical side walls and a pair of links extending between the chute and the beam for loading the beam said link having upper ends, an adjustable compression spring for preloading said beam and means mounting said compression spring from said chute whereby said compression spring reacts between said beam and said chute and normally urges said beam downwardly in a vertical arc around the pivotal connection thereof to said chute, said means mounting said coil spring upon said chute includes means operatively connecting the upper ends of said links together across the upper side of said chute and spaced upwardly from said beam, said compression spring reacting between said beam and said means connecting the upper ends of said links in order to pre-load said beam, a compression spring locating member secured to said overspanning member and engaging within the upper end of said compression spring, a compression spring guiding bolt extending axially through said compression spring and freely through said locating member, an anchor plate at the base of said compression spring, the lower end of said bolt being secured to said anchor plate and securing plate means clamping said anchor plate to said pressure beam, a brace extending rearwardly between the upper end of said guide bolt and said pressure beam, means spanning said bale chamber forwardly of said overspanning member to limit the upward movement of said pressure beam and further means extending transversely of said pressure beam rearwardly of said overspanning member and engageable with the other side of said discharge chute to limit the downward movement of said beam.

5. The bale discharge chute according to claim 4 in which said means to connect the upper ends of said links includes an anchor rod extending upwardly from the upper end of each of said links and an overspanning member extending between adjacent the upper ends of said anchor rods, the upper end of said compression spring being engageable with said overspanning member substantially centrally thereof.

6. The bale discharge chute according to claim 4 which includes means to adjust the effective pressure of said compression spring upon said pressure beam.

* * * * *